United States Patent
Liu et al.

(10) Patent No.: US 11,502,991 B2
(45) Date of Patent: Nov. 15, 2022

(54) EFFICIENTLY COLLECTING AND DISTRIBUTING MULTICAST DATA

(71) Applicant: Shenzhen Fugui Precision Ind. Co., Ltd., Shenzhen (CN)

(72) Inventors: Gui-Song Liu, Shenzhen (CN); Chun-Xi He, Shenzhen (CN)

(73) Assignee: Shenzhen Fugui Precision Ind. Co., Ltd., Shenzhen (CN)

( * ) Notice: Subject to any disclaimer, the term of this patent is extended or adjusted under 35 U.S.C. 154(b) by 0 days.

(21) Appl. No.: 17/068,587

(22) Filed: Oct. 12, 2020

(65) Prior Publication Data
US 2021/0409371 A1 Dec. 30, 2021

(30) Foreign Application Priority Data
Jun. 29, 2020 (CN) .......................... 202010610626.X

(51) Int. Cl.
*H04L 61/5069* (2022.01)
*H04L 12/403* (2006.01)
*H04L 12/40* (2006.01)

(52) U.S. Cl.
CPC ........ *H04L 61/5069* (2022.05); *H04L 12/403* (2013.01); *H04L 2012/40228* (2013.01)

(58) Field of Classification Search
CPC .............. H04L 61/2069; H04L 12/403; H04L 2012/40228; H04L 12/40202; H04W 84/20
See application file for complete search history.

(56) References Cited

U.S. PATENT DOCUMENTS

| | | | | |
|---|---|---|---|---|
| 9,276,900 | B1* | 3/2016 | Daud | H04L 61/2023 |
| 2007/0183418 | A1* | 8/2007 | Riddoch | H04L 49/90 370/389 |
| 2010/0176931 | A1* | 7/2010 | Bennett | H04L 61/2038 340/286.02 |
| 2017/0099222 | A1* | 4/2017 | Bruckner | H04L 69/22 |
| 2018/0091245 | A1* | 3/2018 | Leyrer | H04J 3/0655 |
| 2018/0262432 | A1* | 9/2018 | Ozen | H04L 12/18 |
| 2020/0351624 | A1* | 11/2020 | Lauer | H04L 67/12 |

FOREIGN PATENT DOCUMENTS

| | | |
|---|---|---|
| CN | 110073301 A | 7/2019 |
| CN | 111200547 | 5/2020 |

\* cited by examiner

*Primary Examiner* — Ian N Moore
*Assistant Examiner* — Latresa A McCallum
(74) *Attorney, Agent, or Firm* — ScienBiziP, P.C.

(57) ABSTRACT

A more efficient method of data collecting using multicast instead of individual slave-by-slave requests for data defines a multicast address through a master station. Slave stations are divided into feature groups according to their feature value and a mapping relationship table between the multicast addresses and the feature groups is established. Data request frames from the master station to the slave stations include a destination address which is parsed by all the slave stations, and if the destination address is the same as the multicast address in the mapping relationship table, the slave stations in the feature group associated with the destination address transmit data in response to the master station, the data request being discarded by other slave stations which are not associated.

9 Claims, 3 Drawing Sheets

EFFICIENTLY COLLECTING AND DISTRIBUTING MULTICAST DATA

CROSS-REFERENCE TO RELATED APPLICATIONS

This application claims priority to Chinese Patent Application No. 202010610626.X filed on Jun. 29, 2020, the contents of which are incorporated by reference herein.

FIELD

The subject matter herein generally relates to data collection.

BACKGROUND

In industry, Modbus asynchronous serial link protocol (Modbus protocol) is used to implement centralized management of communication among controllers or between controllers and other network devices. Modbus protocol is a master-slave communication protocol. A master station and multiple slave stations are connected to the same serial bus. Only the master station can initiate requests for data to be sent, and slave stations respond to the request by the master station. In each data collection cycle, according to the Modbus master-slave unicast communication method, the centralized controller master station must send a data request to each slave station to obtain the response. When there is a large number of slave stations, and collection is very active, sending a large number of requests on the serial bus increases a possibility of communication errors. Thus, there is room for improvement within the art.

BRIEF DESCRIPTION OF THE DRAWINGS

Implementations of the present technology will now be described, by way of example only, with reference to the attached figures, wherein.

DETAILED DESCRIPTION

Figure 1:
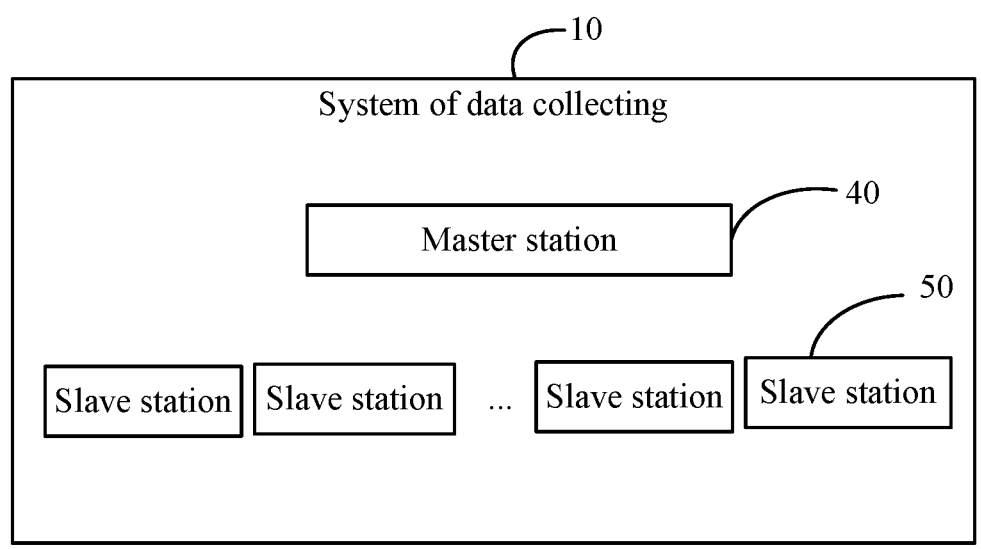
FIG. 1 is a block diagram of an exemplary embodiment of functional modules of a system of data collecting.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

References to "an" or "one" embodiment in this disclosure are not necessarily to the same embodiment, and such references mean "at least one".

In general, the word "module" as used hereinafter, refers to logic embodied in computing or firmware, or to a collection of software instructions, written in a programming language, such as, Java, C, or assembly. One or more software instructions in the modules may be embedded in firmware, such as in an erasable programmable read-only memory (EPROM). The modules described herein may be implemented as either software and/or computing modules and may be stored in any type of non-transitory computer-readable medium or another storage device. Some non-limiting examples of non-transitory computer-readable media include CDs, DVDs, BLU-RAY, flash memory, and hard disk drives. The term "comprising", when utilized, means "including, but not necessarily limited to"; it specifically indicates open-ended inclusion or membership in a so-described combination, group, series, and the like.

Referring to FIG. 1, FIG. 1 is a block diagram of an exemplary embodiment of functional modules of a system of data collecting 10. The system of data collecting 10 includes a master station 40 and at least one slave station 50. In a specific embodiment, the master station 40 can be a controller, and the slave station 50 can be an industrial sensor. The specific applications and respective devices of the master station 40 and the slave station 50 are not limited.

Figure 2:
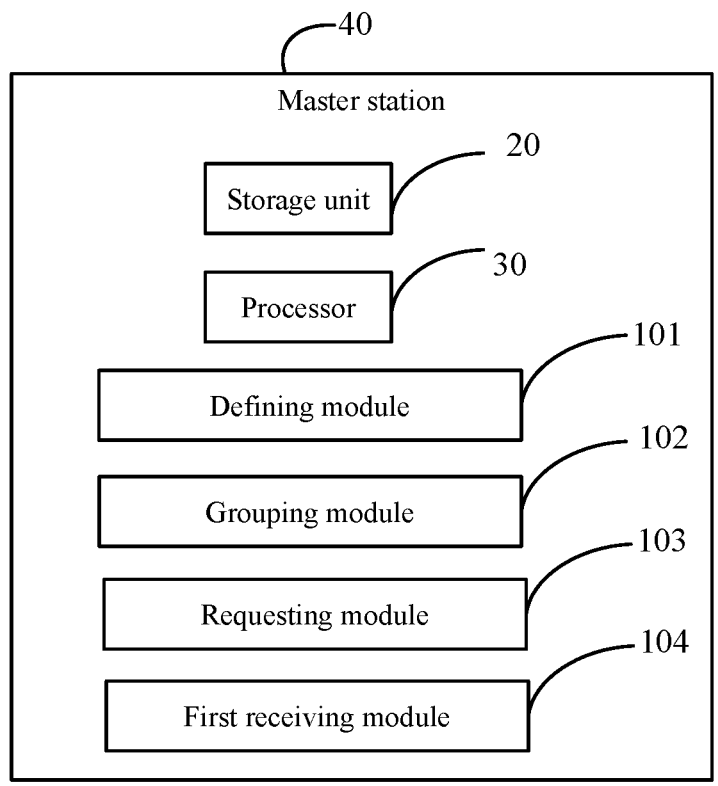
FIG. 2 is a block diagram of an exemplary embodiment of functional modules of a master station and a slave station in a system of data collecting.
Figure 2:
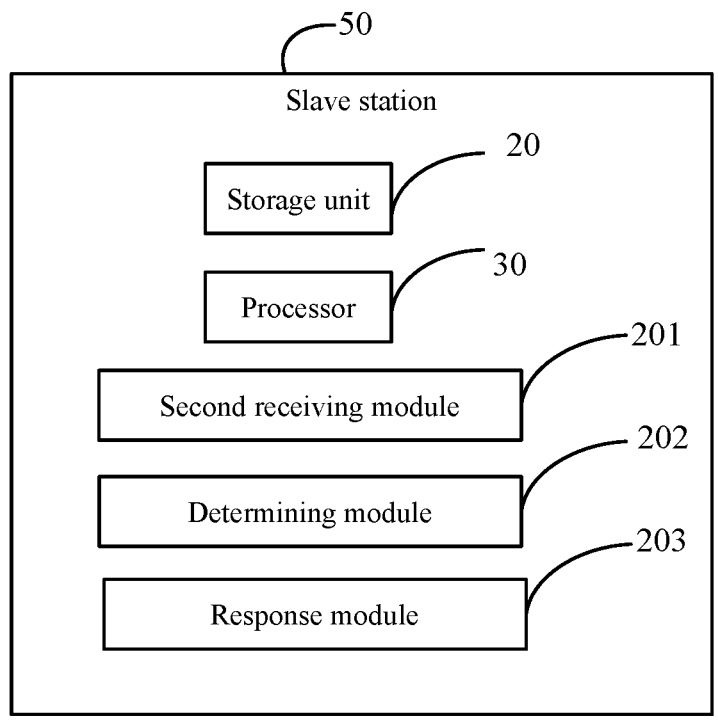

Referring to FIG. 2, FIG. 2 is a block diagram of an exemplary embodiment of functional modules of a master station 40 and a slave station 50 in a system of data collecting 10.

Wherein, the master station 40 includes a storage unit 20, and a processor 30, a defining module 101, a grouping module 102, a requesting module 103, and a first receiving module 104.

The defining module 101 defines a multicast address.

The grouping module 102, divides the slave station 50 into at least one feature group according to a feature value.

The requesting module 103, sends a data request frame to the feature group of the slave station 50.

The first receiving module 104 receives data in response from the feature group of the slave station 50.

The slave station 50 includes a storage unit 20, and a processor 30, a second receiving module 201, a determining module 202, and a response module 203.

The second receiving module 201 receives a data request frame sent by the master station 40, and parses a destination address of the data request frame.

The determining module 202 determines whether the destination address is the same as the multicast address of the feature group of the slave station in a pre-established mapping relationship table, wherein the mapping relationship table includes a mapping relationship between the multicast addresses and the feature group.

The response module 203 of the slave station 50 sends data in response to the master station when the destination address is the same as the multicast address of the feature group of the slave station.

The modules are configured to be executed by one or more processors (in the embodiment, by one processor 30) to achieve the required function. A module is a computer program segment that performs a specific instruction. The storage unit 20 is used to store program code and other data of the system of data collecting 10. The processor 30 is used to execute the program code stored in the storage unit 20.

Wherein, the storage unit 20 includes at least one type of readable storage medium, the readable storage medium includes a flash memory, a hard disk, a multimedia card, a card-type memory (for example, SD or DX memory, etc.), a random access memory (RAM), a static random access memory (SRAM), a read-only memory (ROM), an electrically erasable programmable read only memory (EEPROM), a programmable read-only memory (PROM), a magnetic memory, a magnetic disk, an optical disk, and so on. The processor 30 may be a central processing unit (CPU), a controller, a microcontroller, a microprocessor, or other data processing chip.

Figure 3:
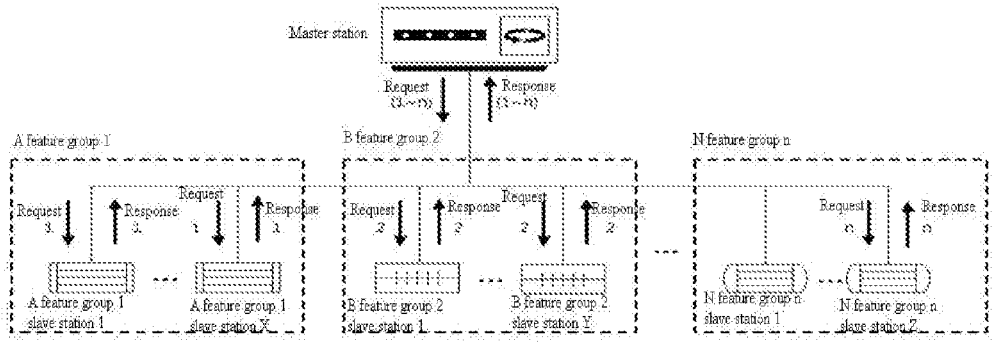
FIG. 3 is a schematic diagram of an exemplary embodiment of slave stations divided into groups.

The following is an embodiment of how data is collected between the master station 40 and the slave station 50:

In the embodiment, the grouping module 102 divides multiple slave stations 50 into at least one feature group according to the feature value of the slave station 50. The feature value can be vendor, data type, format, and so on. For example, in an industrial collection site, industrial sensors of the same manufacturer are divided into feature group 1, industrial sensors of the same data type are divided into feature group 2, and so on. For example, as shown in FIG. 3, the slave stations 50 are divided into A feature group 1, B feature group 2, and N feature group n according to N feature values, a total of n feature groups. To distinguish between the multiple slave stations 50 in each feature group, the slave stations in each feature group are represented as follows. For example, from slave station 1 to slave station X in the A feature group 1, from slave station 1 to slave station Y in the B feature group 2, and from slave station 1 to slave station Z in the N feature group n.

The defining module 101 further establishes a mapping relationship table between the multicast address and the feature group.

The defining module 101 of the master station 40 defines the multicast address, establishes the mapping relationship table between the multicast address and the feature group, and pre-sets the multicast address of each slave station 50 (for example, each sensor in an industrial collection site). For example, feature group 1 with feature A corresponds to multicast address F1, feature group 2 with feature B corresponds to multicast address F2 . . . feature group n with feature N corresponds to multicast address Fn.

After the master station 40 completes initialization, the requesting module 103 of the master station 40 sends the data request frame to each feature group, the data request frame includes a destination address.

In the prior art, a Modbus master station 40 sends the request frame to one slave station 50 with a specific address. Upon receiving and processing the request frame, the slave station 50 sends the response data frame to the master station 40, each slave station having a unique and independent address (1~247). In this procedure, the master station 40 must send the same number of data request frames as there are slave stations 50, and the amount of data is accordingly large. In the embodiment of the disclosure, dividing the slave stations 50 into groups according to the feature value means that the master station 40 only needs to initialize and send the same number of data request frames as there are feature groups, the requests only being issued to each feature group of the slave stations 50 to achieve data collection. The amount of data transmitted by the master station 40 is greatly reduced. In the embodiment, the data request frame sent by the master station 40 includes the destination address of such frame.

The second receiving module 201 of the slave station 50 parses the destination address of the data request frame after the feature group of the slave stations 50 receives the data request frame.

The determining module 202 of the slave station 50 determines whether the destination address is the same as a multicast address in the mapping relationship table of the feature group. When the destination address is the same as the multicast address, the response module 203 of the slave station 50 sends the data in response to the master station 40.

The slave station 50 in the feature group can select a unicast transmission to send the response to the master station 40.

The response module 203 of the slave station 50 further notifies the feature group to discard the data request frame sent by the master station 40 when the destination address is not the same as the multicast address.

After the slave station 50 is divided into groups according to the feature value, the slave station 50 extracts the multicast address which is preset in the feature group from the mapping relationship table, and when receiving the data request frame sent by the master station 40, the slave station 50 only responds to the data request frame containing a destination address same as the preset multicast address and discards the data request frame of the destination address which is different from the preset multicast address.

After the slave station 50 makes the response, the first receiving module 104 of the master station 40 receives the data in response from the feature group of the slave station 50.

In the embodiment, the division of the slave stations 50 into feature groups according to the feature value and defining preset multicast addresses corresponding to such feature groups, the master station 40 only needs to send the same number of data request frames as there are feature groups to each feature group of the slave stations 50 after initialization, to complete data collection by the station 50. The feature group of the slave stations 50 also only responds to data request frames with destination address same as the preset multicast address and discards other data request frames, which greatly reduces the amount of data in the data collection process between the master station 40 and the slave station 50, the efficiency of data collecting is thus improved.

Figure 4:
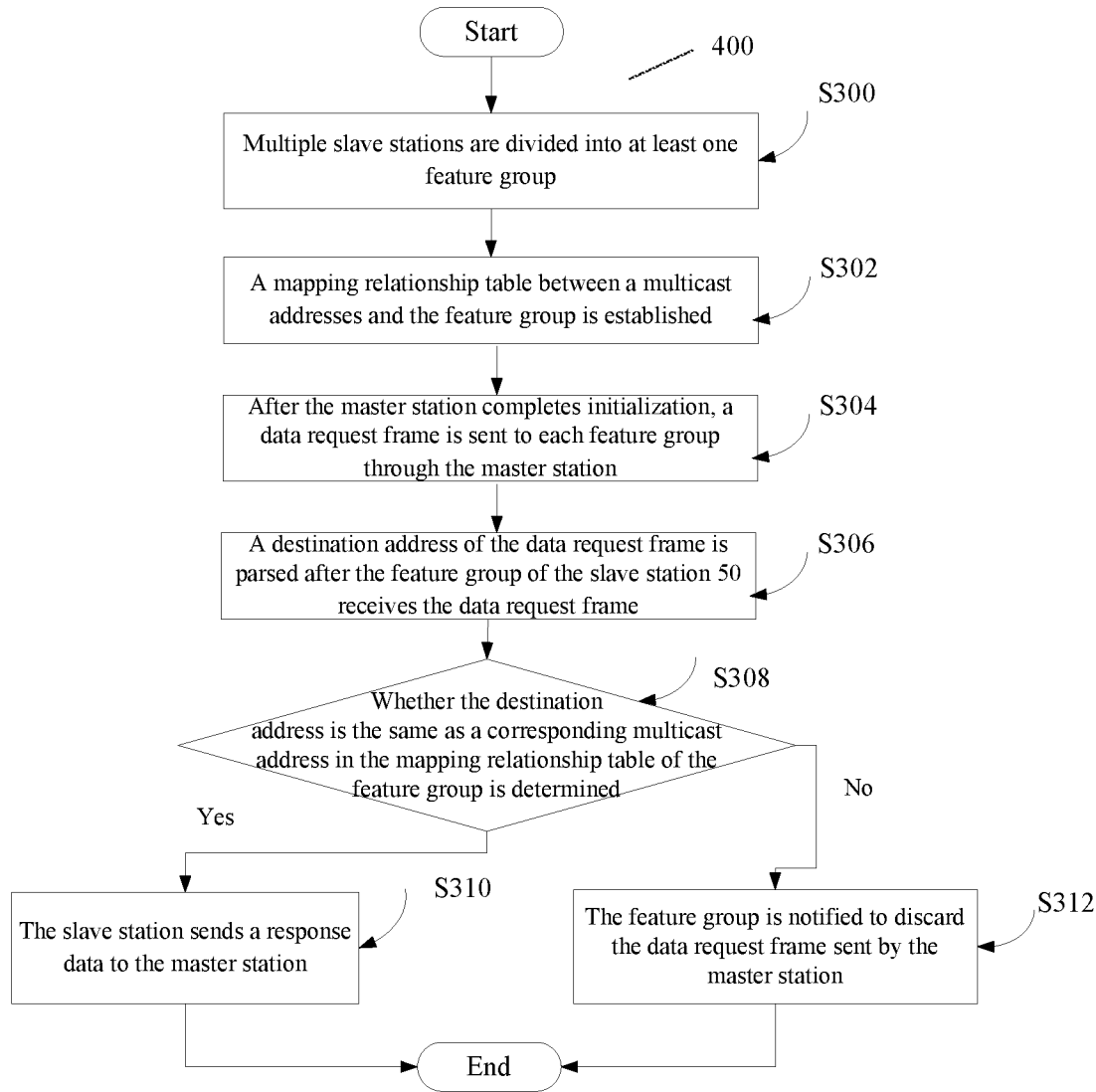
FIG. 4 is a flowchart of an embodiment of a method of data collecting.

Referring to FIG. 4, FIG. 4 is a flowchart in accordance with an embodiment of a method of data collecting, which is applied in a system of data collecting 10. The function modules 101-104 and the function modules 201-203 illustrated in FIG. 2 are executed by the processor 30. Each block shown in FIG. 3 represents one or more processes, methods, or subroutines, carried out in the exemplary method 400. Additionally, the illustrated order of blocks is by example only and the order of the blocks can be changed. The method 400 can begin at block 300.

At block 300, multiple slave stations 50 are divided into at least one feature group.

In the embodiment, multiple slave stations 50 are divided into at least one feature group according to a feature value of the slave station 50. The feature value can be vendor, data type, format, and so on. For example, in an industrial collection site, industrial sensors of the same manufacturer are divided into feature group 1, industrial sensors of the same data type are divided into feature group 2, and so on. For example, as shown in FIG. 3, the slave stations 50 are divided into A feature group 1, B feature group 2 . . . N feature group n according to N feature values, a total of n feature groups. To distinguish between the multiple slave stations 50 in each feature group, the slave stations in each feature group are represented as follows: For example, from slave station 1 to slave station X in the A feature group 1, from slave station 1 to slave station Y in the B feature group 2, and from slave station 1 to slave station Z in the N feature group n.

At block 302, a mapping relationship table between a multicast address and the feature group is established.

A master station 40 defines a multicast address through the master station. The system of data collecting 10 establishes the mapping relationship table between the multicast addresses and the feature group and pre-sets the multicast address to each slave station 50 (for example, each sensor in an industrial collection site).

At block 304, after the master station 40 completes initialization, a data request frame is sent to each feature group through the master station 40, and the data request frame includes a destination address.

In the prior art, a Modbus master station 40 sends the request frame to one slave station 50 with a specific address. Upon receiving and processing the request frame, the slave station 50 sends the response data frame to the master station 40, each slave station having a unique and independent address (1~247). In this procedure, the master station 40 must send the same number of data request frames as there are slave stations 50, and the amount of data is large. In the embodiment, after the slave stations 50 are divided into groups according to the feature value, the master station 40 only needs to initialize and send the same number of data request frames as the feature groups to each feature group of the slave station 50 to achieve data collection. The amount of data transmitted by the master station 40 is greatly reduced. In the embodiment, the data request frame sent by the master station 40 includes the destination address of each data request frame.

At block 306, the destination address of the data request frame is parsed after the feature group of the slave station 50 receives the data request frame.

At block 308, whether the destination address is the same as a multicast address in the mapping relationship table of the feature group is determined. When the destination address is the same as the multicast address, block 310 is executed, when the destination address is not the same as the multicast address, block 312 is executed.

At block 310, the slave station 50 sends a response data to the master station 40.

At block 312, the feature group is notified to discard the data request frame sent by the master station 40.

After the slave station 50 is divided into groups according to the feature value, the slave station 50 extracts the multicast address preset in the feature group from the mapping relationship table, and when receiving the data request frame sent by the master station 40, the slave station 50 only responds to the data request frame of the destination address same with the preset multicast address and discards the data request frame of the destination address different from the preset multicast address.

In the embodiment, the division of the slave stations 50 into feature groups according to the feature value and defining preset multicast addresses corresponding to such feature groups, the master station 40 only needs to send the same number of data request frames as the feature groups to each feature group of the slave station 50 after initialization to complete data collecting from the station 50. The feature group of the slave station 50 also only responds to the data request frame of the destination address same with the preset multicast address and discards the data request frame of the destination address different from the preset multicast address, which greatly reduces the amount of data in the data collecting process between the master station 40 and the slave station 50 and improves the efficiency of data collection.

The embodiments shown and described above are only examples. Many details are often found in the relevant art and many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A method of data collecting, executed in a system of data collecting, the system of data collecting comprises a master station and at least one slave station, the method comprising:
    defining multicast addresses by the master station;
    dividing the at least one slave station into at least one feature group according to a feature value, wherein the at least one slave station are industrial sensors in an industrial collection site, industrial sensors of a same manufacturer in the industrial collection site are divided into a first feature group, and industrial sensors of a same data type in the industrial collection site are divided into a second feature group;
    establishing a mapping relationship table between the multicast addresses and the at least one feature group;
    sending a data request frame to the at least one feature group through the master station, wherein the data request frame comprises a destination address;
    receiving the data request frame through the at least one feature group of the at least one slave station, and parsing the destination address of the data request frame;
    determining whether the destination address is the same as a corresponding multicast address in the mapping relationship table of the at least one feature group through the at least one slave station; and
    when the destination address is the same as the corresponding multicast address, sending a response data to the master station by the at least one slave station.

2. The method as claimed in claim 1, the method further comprising:
    when the destination address is not the same as the corresponding multicast address, notifying the at least one feature group to discard the data request frame sent by the master station.

3. The method as claimed in claim 1, the step of sending a response data to the master station by the at least one slave station comprises:
    notifying the at least one slave station in the at least one feature group to select a unicast transmission to send the response data to the master station.

4. A method of data collecting executed in at least one slave station, the at least one slave station communicating with a master station and being divided into at least one feature group according to a feature value, the method comprising:
    receiving a data request frame sent by the at least one slave station, and parsing a destination address of the data request frame, wherein the at least one slave station are industrial sensors in an industrial collection site, industrial sensors of a same manufacturer in the industrial collection site are divided into a first feature group, and industrial sensors of a same data type in the industrial collection site are divided into a second feature group;

determining whether the destination address is the same as a corresponding multicast address of the at least one feature group of the at least one slave station in a pre-established mapping relationship table, wherein the mapping relationship table comprises a mapping relationship between the corresponding multicast address and the at least one feature group; and when the destination address is the same as the corresponding multicast address of the at least one feature group of the at least one slave station, sending a response data to the master station by the at least one slave station.

5. The method as claimed in claim 4, the method further comprising:

when the destination address is not the same as the corresponding multicast address, discarding the data request frame sent by the master station.

6. The method as claimed in claim 4, the step of sending a response data to the master station by the at least one slave station comprises:

the at least one slave station selecting a unicast transmission to send the response data to the master station.

7. A system of data collecting, the system of data collecting comprises a master station and at least one slave station, the system of data collecting further comprising:

at least one processor;

a storage unit; and one or more programs that are stored in the storage unit and executed by the at least one processor, the one or more programs comprising instructions for:

defining multicast addresses through the master station;

dividing the at least one slave station into at least one feature group according to a feature value, wherein the at least one slave station are industrial sensors in an industrial collection site, industrial sensors of a same manufacturer in the industrial collection site are divided into a first feature group, and industrial sensors of a same data type in the industrial collection site are divided into a second feature group;

establishing a mapping relationship table between the multicast addresses and the at least one feature group;

sending a data request frame to the at least one feature group through the master station, wherein the data request frame comprises a destination address;

receiving the data request frame through the at least one feature group of the at least one slave station, and parsing the destination address of the data request frame;

determining whether the destination address is the same as a corresponding multicast address in the mapping relationship table of the at least one feature group through the at least one slave station; and when the destination address is the same as the corresponding multicast address, sending a response data to the master station by the at least one slave station.

8. The system as claimed in claim 7, the one or more programs further comprising instructions for:

when the destination address is not the same as the corresponding multicast address, notifying the at least one feature group to discard the data request frame sent by the master station.

9. The system as claimed in claim 7, the step of sending a response data to the master station by the at least one slave station comprises:

notifying the at least one slave station in the at least one feature group to select a unicast transmission to send the response data to the master station.

* * * * *